(12) United States Patent
Singh et al.

(10) Patent No.: US 7,058,058 B2
(45) Date of Patent: Jun. 6, 2006

(54) TRANSPARENT OPTIMIZATION FOR TRANSMISSION CONTROL PROTOCOL INITIAL SESSION ESTABLISHMENT

(75) Inventors: Balraj Singh, Los Altos, CA (US);
Amit P. Singh, Sunnyvale, CA (US);
Vern Paxson, Berkeley, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 10/983,131

(22) Filed: Nov. 4, 2004

(65) Prior Publication Data
US 2005/0135250 A1    Jun. 23, 2005

Related U.S. Application Data

(60) Provisional application No. 60/517,934, filed on Nov. 5, 2003.

(51) Int. Cl.
*H04L 12/28* (2006.01)
(52) U.S. Cl. ...................... 370/394; 709/227
(58) Field of Classification Search ............. 370/392, 370/235, 394; 709/227, 228
See application file for complete search history.

(56) References Cited

U.S. PATENT DOCUMENTS

| | | | |
|---|---|---|---|
| 6,381,638 B1 * | 4/2002 | Mahler et al. | 709/220 |
| 6,389,462 B1 * | 5/2002 | Cohen et al. | 709/218 |
| 6,564,267 B1 * | 5/2003 | Lindsay | 709/250 |
| 6,587,438 B1 * | 7/2003 | Brendel | 370/238 |
| 6,742,044 B1 * | 5/2004 | Aviani et al. | 709/227 |
| 6,772,334 B1 * | 8/2004 | Glawitsch | 713/153 |
| 6,779,033 B1 * | 8/2004 | Watson et al. | 709/227 |
| 6,826,613 B1 * | 11/2004 | Wang et al. | 709/227 |
| 2005/0135252 A1 | 6/2005 | Singh et al. | |

* cited by examiner

*Primary Examiner*—Andy Lee
(74) *Attorney, Agent, or Firm*—Shumaker & Sieffert, P.A.

(57) ABSTRACT

A system and method that optimizes transmission control protocol (TCP) initial session establishment without intruding upon TCP's core algorithms. TCP's initially session establishment is accelerated by locally processing a source's initial TCP request within the source's local area network (LAN). A control module relatively near the source's local area network (LAN) and another control module relatively near a destination's LAN are utilized to complete the initial TCP session establishment within the source and the destination's respective LANs, thereby substantially eliminating the first round-trip time delay before the actual data flow begins. The first application-layer data packet thus can be transmitted at substantially the same time as the initial TCP request.

30 Claims, 6 Drawing Sheets

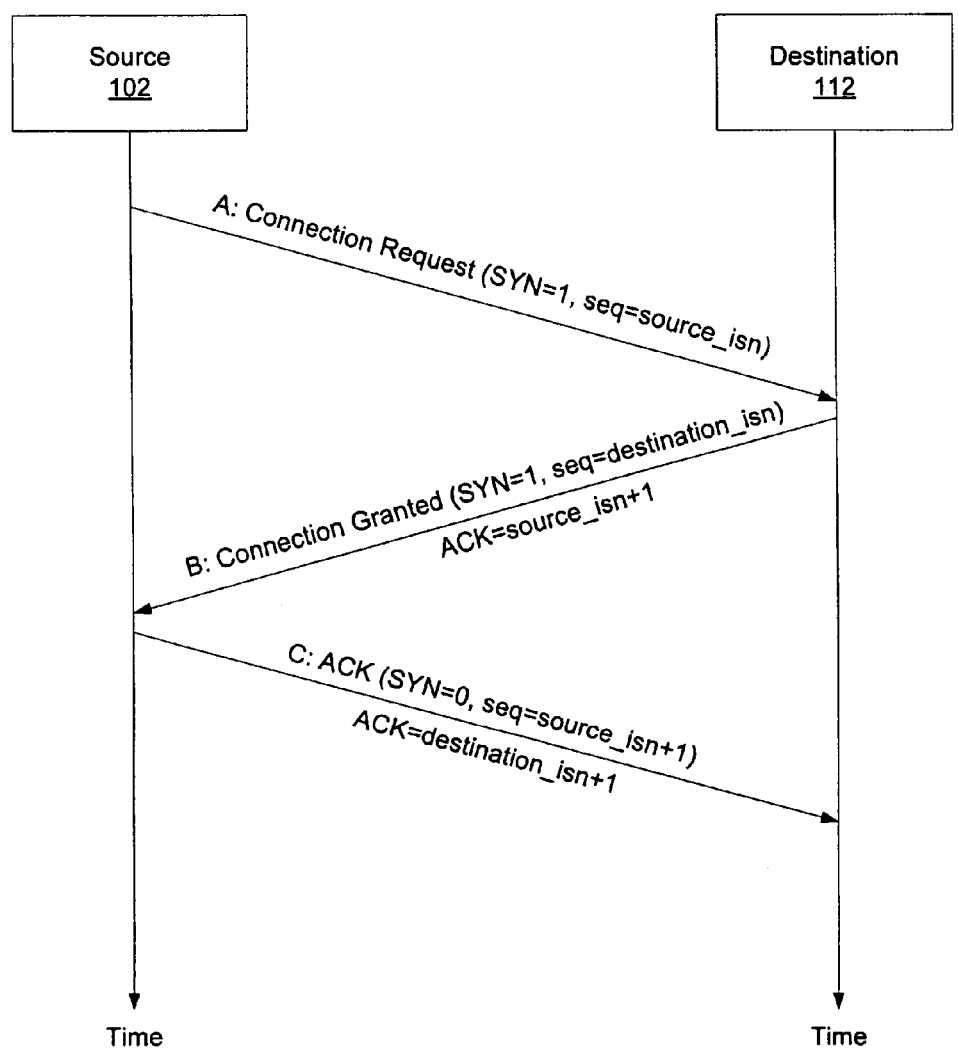

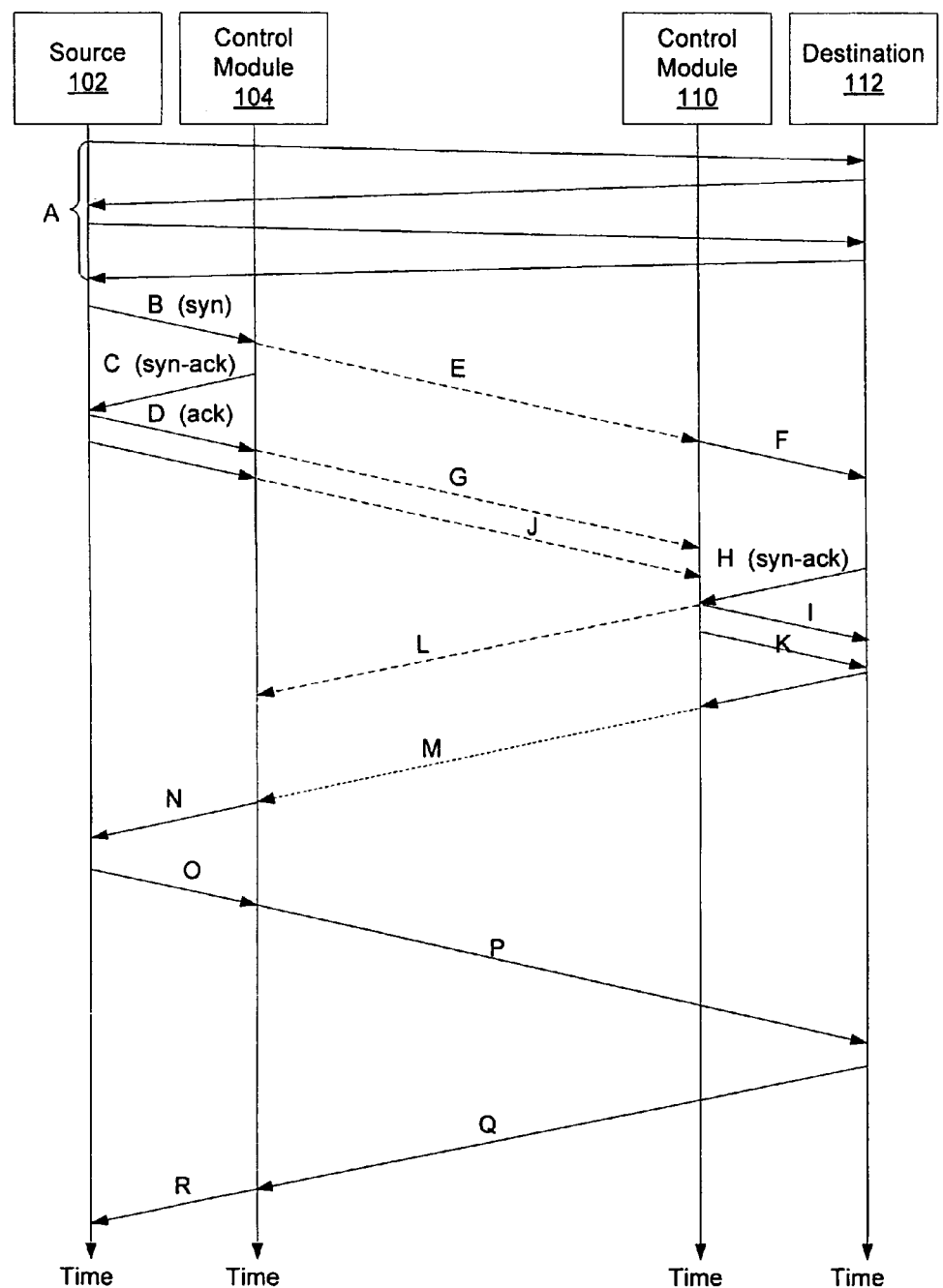

TRANSPARENT OPTIMIZATION FOR TRANSMISSION CONTROL PROTOCOL INITIAL SESSION ESTABLISHMENT

RELATED APPLICATIONS

This application claims priority from U.S. provisional application No. 60/517,934 filed on Nov. 5, 2003 which is incorporated by reference herein in its entirety.

This application is related to U.S. patent application Ser. No. 10/981,900, filed on Nov. 4, 2004, entitled "Transparent Optimization for Transmission Control Protocol Flow Control", the contents of which are hereby incorporated by reference.

FIELD OF THE INVENTION

The present invention relates to the field of networking and the communication of data over a network and more particularly to transparent optimization for transmission control protocol (TCP) initial session establishment.

BACKGROUND OF THE INVENTION

The transmission control protocol (TCP) is one of the most widely used and reliable data transport protocols across communications networks. One of TCP's primary distinctions and the reasons for its widespread use is that TCP provides reliable communications. A "reliable" data transport protocol is one that provides accurate, loss-free, and in order delivery of data from a source to a destination. If there is any packet loss or packet reordering during transmission of the data across a communications network, TCP internally corrects such an error by retransmitting the lost data and by buffering the out-of-order data until the missing data arrives. TCP then delivers the data to the destination in the same initial order. Hence, by using TCP as its data transport protocol, an application can effectively operate in a best-effort packet switched network that does not guarantee data packet delivery. This reliable transport capability simplifies data communications, thus resulting in the widespread adoption of TCP.

TCP utilizes various internal algorithms to provide its capability of reliable transport. These algorithms include initial session establishment, slow start, packet reordering, packet loss detection, and numerous other mechanisms to dynamically decrease or increase the data transmission rate based on network conditions.

Network latency is a common problem that affects network and application performance. Network latency is attributable to several factors, including physical distance, number of hops, switching and router delays, and network congestion. Because these factors are not constants, networks may have unpredictable latency over a period of time. The variation in network latency depends on the distance spanned by the network link and the transmission medium used by the link. For instance, a local high-speed dedicated line between two buildings within a metro area may experience less than 5 milliseconds (ms) of one-way latency, while a global long distance asynchronous transfer mode (ATM) link between the United States and Europe may have anywhere from 50 to 250 ms of one-way latency. Similarly, a satellite link typically incurs about 240 to 300 ms of one-way latency, due to the time to transmit a signal up to an orbiting satellite and back.

The impact of latency on network applications may be traced directly to the inefficiencies of TCP under conditions of network latency. Most network applications can be classified into short-transaction based "chatty" applications or long-bulk data transfer applications. Common sources of short-transaction based network traffics include interactive applications (e.g., graphical or web-based user interfaces), various databases, enterprise resource planning (ERP) applications, customer relationship management (CRM) applications, etc. As users access and browse these applications, the applications typically generate numerous short TCP sessions to send and receive small amounts of information that the application then collects and presents to the users. Though most of these short TCP sessions involve sending or receiving a few hundred bytes or kilobytes of data, the actual data transfer is delayed because of TCP's initial session establishment.

To provide reliable communications, TCP first establishes a formal session between a source and a destination before transmitting any application-layer data. TCP provides this initial session establishment such that the destination does in fact receive and acknowledge the transmitted data. Accordingly, the destination can communicate with the source even if any data is lost. TCP's initial session establishment is based on the source first sending a request to initiate a session and then waiting for a response from the destination before transmitting the first application-layer data packet. This initial request and acknowledgment process utilizes one round-trip time (RTT). Hence, even if the source desires to transmit a small number of application-layer data packets across a high latency link, a portion of the total communications time is wasted on the initial session establishment. Thus, the cumulative delay due to the latency on the initial session establishment may decrease the end-user application performance, especially for chatty applications that established many short, serialized TCP sessions.

What is needed is a system and method for optimizing TCP's initial session establishment to improve the performance of short, serialized TCP sessions without intruding upon TCP's core algorithms.

SUMMARY OF THE INVENTION

The present invention is a system and method for optimizing TCP's initial session establishment without intruding upon TCP's core algorithms. The invention accelerates TCP's initial session establishment by locally processing a source's initial TCP request within the source's local area network (LAN). The present invention utilizes a control module relatively near the source's LAN and another control module relatively near a destination's LAN to complete the initial TCP session establishment within the source and the destination's respective LANs, thereby substantially eliminating the first RTT delay before the actual data flow begins. The invention thus allows the first application-layer data packet to be transmitted at substantially the same time as the initial TCP request. In one embodiment, the present invention optionally observes one or more TCP sessions between the source and the destination before accelerating the initial session establishment. The invention observes the one or more TCP sessions to provide a mechanism for error recovery during the optimization process.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for read-

BRIEF DESCRIPTION OF THE DRAWINGS

FIG. 2 is a flowchart illustrating the conventional operation of TCP's initial session establishment.

FIG. 3 is a flowchart illustrating a method implemented by one embodiment of the present invention for optimizing TCP's initial session establishment.

DETAILED DESCRIPTION OF THE INVENTION

Figure 1:
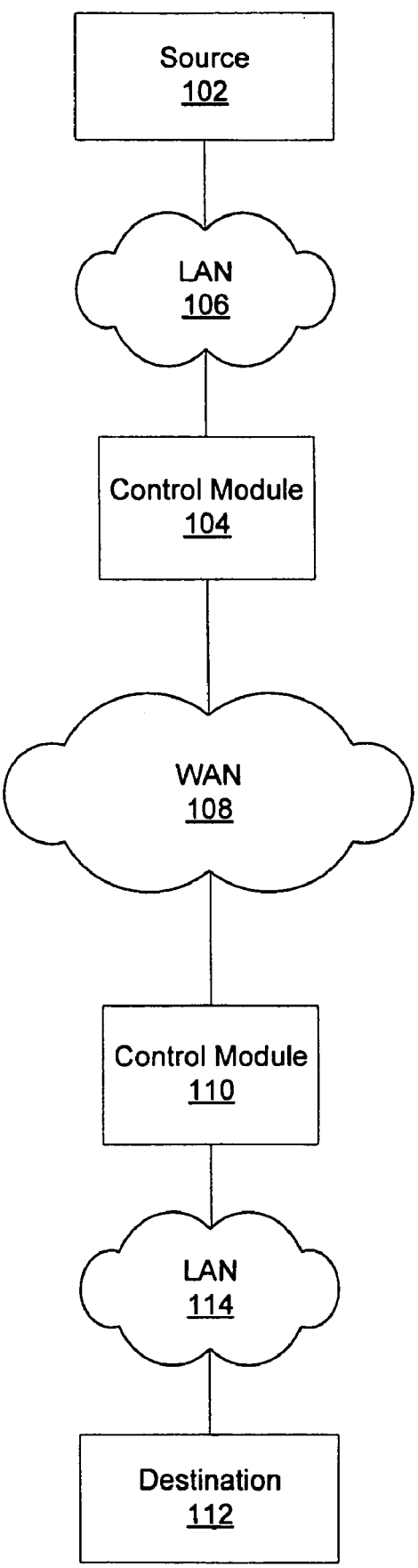
FIG. 1 is an illustration of one example of a network environment in which the present invention can operate.

A preferred embodiment of the present invention is now described with reference to the figures where like reference numbers indicate identical or functionally similar elements. Also in the figures, the left most digit of each reference number corresponds to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient characterizes applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

FIG. 1 is an illustration of one example of a network environment in which the present invention can operate. A source 102 can be any device that sends/receives data to/from one or more endpoints using TCP. For illustration purposes, source 102 as described hereinafter is any device that can request a TCP session. Source 102 is connected to a control module 104 (e.g., in a control device) via a communications network, such as a LAN 106. Alternatively, control module 104 is directly connected to the source 102 without via the LAN 106 or is implemented within source 102 as a program module. Control module 104 is connected to one or more other control modules via another communications network such as a wide area network (WAN) 108. Even though FIG. 1 shows that control module 104 is connected to one other control module (i.e., the control module 110), control module 104 can be connected to more than one control module. Each of the other control modules is connected to a destination via yet another communications network. For example, FIG. 1 shows that control module 110 (e.g., in a control device) is connected to a destination 112 via a LAN 114. The destination 112 can be any device that receives/sends data from/to one or more endpoints using TCP. For illustration purposes, destination 112 as described hereinafter is any device that can respond to the TCP request sent by source 102. Moreover, control module 110 can be directly connected to destination 112 without via the LAN 114 or can be implemented within destination 112 as a program module.

In one embodiment of the invention, control module 104 is located relatively nearer to source 102 than to destination 112, while control module 110 is located relatively nearer to destination 112 than to source 102. Accordingly, control module 104 is physically and logically associated with source 102, and control module 110 is physically and logically associated with destination 112.

As discussed, TCP's initial session establishment that requires the first application-layer data packet to be sent after the initialization is complete may delay the TCP transaction between source 102 and destination 112. This process introduces at least one RTT of delay per transaction, which in the case of a high latency link may amount to 500 to 1000 ms of delay. When many of these short transactions are serially executed, the cumulative delay from this initialization process may be significant. Thus, in an embodiment of the invention, control module 104 and control module 110 cooperate to predictably and reliably complete the initial TCP session establishment within the respective LANs of source 102 and destination 112. Control module 104 and control module 110 provide an optimization that is non-intrusive and transparent to TCP. That is, control modules 104 and 110 operate transparently to TCP's end-to-end reliability algorithms and avoid the complexities and risks of replacing TCP as the transmission protocol. Control modules 104 and 110 do not generate any acknowledgment for data that has not actually been received and instead use an existing acknowledgment to optimize the data flow. Accordingly, TCP's reliability protocols continue to operate end-to-end as if control modules 104 and 110 do not exist. The present invention thus non-intrusively improves TCP's latency performance by optimizing TCP's initial session establishment.

FIG. 2 illustrates the conventional operation of TCP's initial session establishment without control modules 104 and 110. At A, source 102 first sends a special TCP packet to destination 112. This special packet includes no application-layer data. It does, however, have one of the flag bits in the packet's header, called the synchronization (SYN) bit, set to TRUE. This special packet is often referred to as a SYN packet. Furthermore, source 102 selects an initial sequence number called source_isn and inserts this value in the initial SYN packet's sequence number field. Source 102 encapsulates this SYN packet within an internet protocol (IP) datagram and sends it to destination 112.

At B, after the IP datagram including the SYN packet arrives at destination 112, destination 112 extracts the SYN packet from the IP datagram, allocates the TCP buffers and variables to the connection, and sends a TCP connection-granted packet to source 102. This connection-granted packet also includes no application-layer data. However, the SYN bit in the packet header is set to TRUE. Destination 112 also sets the ACK bit in the packet header and the acknowledgment field of the connection-granted packet header to source_isn+1. Moreover, destination 112 selects its own initial sequence number called destination_isn and inserts this value in the sequence number field of the connection-granted packet header. The connection-granted packet is often referred to as a synchronization-acknowledgment (SYN-ACK) packet.

At C, after receiving the connection-granted packet, source 102 allocates buffers and variables to the connection. Source 102 then sends yet another packet to destination 112. This packet acknowledges the connection-granted packet of destination 112. Specifically, source 102 inserts the value destination_isn+1 in the acknowledgment field of the TCP packet header. Source 102 also sets the TCP packet header's SYN bit to FALSE, since the TCP connection is established.

After steps A–C have been completed, source 102 and destination 112 can send packets including application-layer data to each other. In each of these future packets, the SYN bit is set to FALSE.

As can be seen, three packets are sent between source 102 and destination 112 to establish an initial TCP session between source 102 and destination 112. Thus, this session establishment procedure is often referred to as a "three-way handshake." Even though the TCP three-way handshake provides reliable delivery of data, source 102 is required to receive the SYN-ACK packet from destination 112 before it can begin to transmit application-layer data to destination 112, and destination 112 is required to receive the last packet of the three-way handshake before it can begin to transmit application-layer data to source 102. This requirement delays the application-layer data transmission, especially for multiple short TCP transactions that are serially executed.

FIG. 3 illustrates an exemplary operation of TCP's initial session establishment optimized by control modules 104 and 110 according to an embodiment of the invention. According to a preferred embodiment of the invention, before optimizing TCP's initial session establishment, control module 104 associated with source 102 gathers information about destination 112 and stores this information in a database. As illustrated, at A, control module 104 first allows source 102 to establish one or more TCP sessions with destination 112. Even though control modules 104 and 110 do not interfere with such TCP sessions, control module 104 observes the responses of destination 112 to the SYN packets sent by source 102. Control module 104 further observes a network address such as the IP address of destination 112. Particularly, control module 104 observes one or more responses of destination 112 to a SYN packet to determine the TCP options used in response to the TCP options in the SYN packet for the IP address of destination 112. Control module 104 then stores the responses of destination 112 having different combinations of TCP options in a database maintained by control module 104. The responses are stored in the database in a per IP address, per TCP option combination manner. After control module 104 observes a sufficient number (e.g., 5) of TCP sessions between source 102 and destination 112 having a specific TCP option combination, and if the responses from destination 112 are consistent, then control module 104 "activates" the IP address and the specific TCP option combination of destination 112.

After control module 104 activates the IP address and TCP option combination of destination 112, source 102 sends a SYN packet to destination 112 at B. Control module 104 intercepts this SYN packet and, at C, responds to source 102 with a synthesized SYN-ACK packet having the IP address, port number, and TCP option combination of destination 112 as indicated in the database. Control module 104 also predictably or arbitrarily decides an initial sequence number (called synth_isn) and inserts this value in the sequence number field of the SYN-ACK packet header. At D, source 102 responds to the synthesized SYN-ACK packet sent by control module 104 with an acknowledgment (ACK) packet and puts itself into a session-established state. Source 102 then commences application-layer data transmission. Moreover, control module 104 characterizes the ACK packet and sends it to destination 112.

After control module 104 intercepts the SYN packet sent from source 102 to destination 112, it characterizes this SYN packet and inserts the synth_isn into the TCP header or the characterized SYN packet header, either as an unused TCP option or in the acknowledgment number field, or as additional data that is sent along with the packet. Control module 104 then sends the characterized SYN packet to destination 112 at E. During the time beginning when source 102 puts itself in the session-established state until source 102 receives information that destination 112 is also in the session-established state, control module 104 will characterize any data packet from source 102 to destination 112. Control module 104 characterizes a SYN packet or data packet by using one or more fields available in the TCP header or by adding data to the packet.

Before the characterized SYN packet reaches destination 112, control module 110 associated with destination 112 intercepts this characterized SYN packet. Control module 110 removes the characterization and finds out the synth_isn from the SYN packet. For example, control module 110 may find out an arbitrarily decided synth_isn based on what is included in the TCP header, the characterized SYN packet header, or the additional data being sent along with the packet. However, if the synth_isn was predictably decided by control module 104, control module 110 may use the same prediction method to derive the synth_isn after it determines that the SYN packet header is "characterized." Control module 110 then sends the characterization-free SYN packet to destination 112 at F.

Before control module 110 receives a SYN-ACK packet from destination 112, it may receive the characterized ACK packet from source 102 at G. In this case, control module 110 temporarily stores this characterized ACK packet in a memory area while waiting for the SYN-ACK packet from destination 112.

When destination 112 sends the SYN-ACK packet to source 102 at H, control module 110 intercepts this SYN-ACK packet. From the SYN-ACK packet, control module 110 learns the initial sequence number used by destination 114 (referred to as destination_isn) and then sends the SYN-ACK packet to source 102. Control module 110 then adjusts the temporarily stored ACK packet from source 102 to destination 112 based on the destination_isn.

In a preferred embodiment of the invention, control module 110 adjusts the ACK packet by computing an adjustment number called SeqAckAdjustment. For example, the SeqAckAdjustment can be computed by subtracting the destination_isn from the synth_isn. Accordingly, after control module 110 computes the SeqAckAdjustment, control module 110 releases the ACK packet that is temporarily stored in the memory area. Specifically, control module 110 removes the characterization from the ACK packet and adjusts the packet using the computed SeqAckAdjustment, for example, by subtracting the computed SeqAckAdjustment from the ACK packet's acknowledgment number and making a corresponding adjustment to the ACK packet's checksum. Control module 110 then sends the adjusted ACK packet to destination 112 at I.

In addition, if control module 110 receives a characterized data packet from source 102 before it receives the SYN-ACK packet from destination 112 (e.g., at J), it temporarily stores the characterized data packet. After the SYN-ACK packet arrives from destination 112, control module 110 removes the characterization from the data packet, adjusts the data packet (e.g., by subtracting the computed SeqAck-Adjustment from the data packet's acknowledgment number and making a corresponding adjustment to the data packet's checksum), and sends the adjusted data packet to destination 112 at K. For subsequent characterized data packets arriving from source 102, control module 110 removes the characterization from the data packets, adjusts the data packets, and sends the adjusted data packets to destination 112.

According to an embodiment of the invention, if the SYN packet characterized by control module 104 is lost before it reaches control module 110, control module 110 may recover the information included in this lost SYN packet from a subsequent data packet arriving from control module 104 (e.g., at J). Accordingly, control module 110 can recover the lost information, recreate the SYN packet, and send the recreated SYN packet to destination 112. This operation also applies if the SYN packet reaches control module 110 after the data packet arrives at control module 110. Furthermore, if the SYN packet is lost on its way from control module 110 to destination 112, control module 110 can use the information included in the subsequent data packet to recreate another SYN packet and send the recreated SYN packet to destination 112.

In another embodiment of the invention, if the SYN-ACK packet from destination 112 is lost on its way to control module 110, control module 110 recreates the SYN packet based on the information included in the subsequent data packet (e.g., that arrives at J). Control module 110 then sends the recreated SYN packet to destination 112 for destination 112 to transmit another SYN-ACK packet.

Before the SYN-ACK packet from destination 112 arrives at control module 104 associated with source 102, control module 104 may receive a data packet from destination 112 before it receives the SYN-ACK packet from destination 112. In this case, control module 104 temporarily stores this data packet in a memory area.

At L, control module 104 receives the SYN-ACK packet from destination 112. From the received SYN-ACK packet, control module 104 learns the destination_isn and adjusts the temporarily stored data packets and subsequent data packets between source 102 and destination 112 based on the destination_isn. Control module 104 also examines the SYN-ACK packet to determine if it was formed as suggested in the database. If control module 104 determines that the SYN-ACK packet was not formed as suggested in the database (e.g., the IP address and/or the TCP option combination are different), then it "deactivates" destination 112 in the database and then observes subsequent regular TCP sessions between source 102 and destination 112 (without interference from control modules 104 and 110) to determine the correct information about destination 112.

In any case, control module 104 consumes the SYN-ACK packet and does not send the SYN-ACK packet to source 102.

In an embodiment of the invention, if the SYN-ACK packet from destination 112 is lost on its way from control module 110 to control module 104, control module 104 can detect this loss because a data packet from destination 112 reaches control module 104 before the SYN-ACK packet arrives at control module 104. In this case, control module 104 uses an out-of-band TCP channel to control module 110 to request the value of the SeqAckAdjustment in order for it to adjust the data packet. Alternatively, control module 104 can use the out-of-band TCP channel to explicitly request control module 110 to retransmit the SYN-ACK packet.

According to a preferred embodiment of the invention, control module 104 adjusts the data packets from destination 112 to source 102 by computing the SeqAckAdjustment. The SeqAckAdjustment may be computed by subtracting the destination_isn from the synth_isn. Therefore, after control module 104 computes the SeqAckAdjustment, it adjusts and releases the data packet that is temporarily stored in the memory area. For example, control module 104 readjusts the stored data packets by adding the computed SeqAckAdjustment to the data packet's sequence number and making a corresponding adjustment to the data packet's checksum. Control module 104 then sends the adjusted data packet to source 102. In addition, if control module 104 receives a data packet from destination 112, for example, at M, it adjusts the received data packet by, for example, adding the computed SeqAckAdjustment to the data packet's sequence number and making a corresponding adjustment to the data packet's checksum. Control module 104 then sends the adjusted data packet to source 102 at N.

In addition, after control module 104 computes the SeqAckAdjustment and receives a data packet from source 102, for example, at O, it adjusts the received data packet by, for example, subtracting the computed SeqAckAdjustment from the data packet's acknowledgment number and making a corresponding adjustment to the data packet's checksum. Control module 104 then sends the adjusted data packet to destination 112 at P without any characterizing. Since this data packet is not characterized, control module 110 does not intercept the data packet on its way to destination 112. Thus, the characterization-free data packet is directly transmitted to destination 112 without any interference from control module 110. From this point on, normal TCP transaction may continue without further involvements from control module 110. For the rest of the packets in this TCP transaction, processing of the sequence number for packets going from destination 112 to source 102 (e.g., at Q and R) and of the acknowledgment numbers for packets going from source 102 to destination 112 (e.g., at O and P) will be done by control module 104.

As can be seen, by intercepting the SYN packet from source 102 and sending the synthesized SYN-ACK packet to source 102 in response to the SYN packet, control module 104 allows source 102 to begin transmitting application-layer data to destination 112 without waiting for the real SYN-ACK packet from destination 112. This speeds up TCP's initial session establishment, especially for multiple short TCP transactions that are serially executed. By having control module 110 cooperating with control module 104, embodiments of the invention optimize TCP's initial session establishment without intruding upon TCP's core algorithms.

Figure 4A:
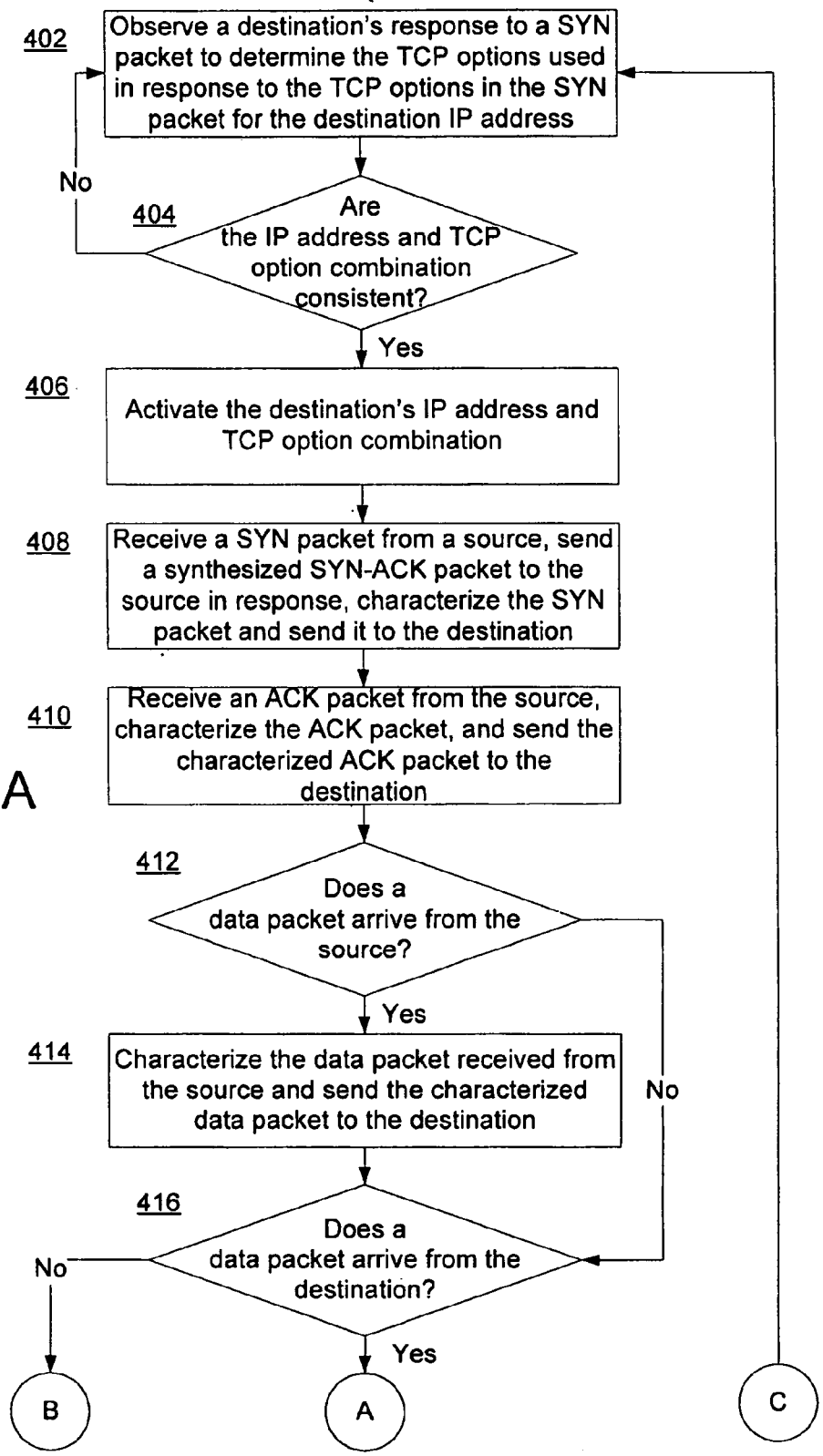
FIGS. 4A and 4B are flowcharts illustrating a method implemented by one embodiment of the invention and executed by a control module relatively near a source to optimize TCP's initial session establishment.
Figure 4B:
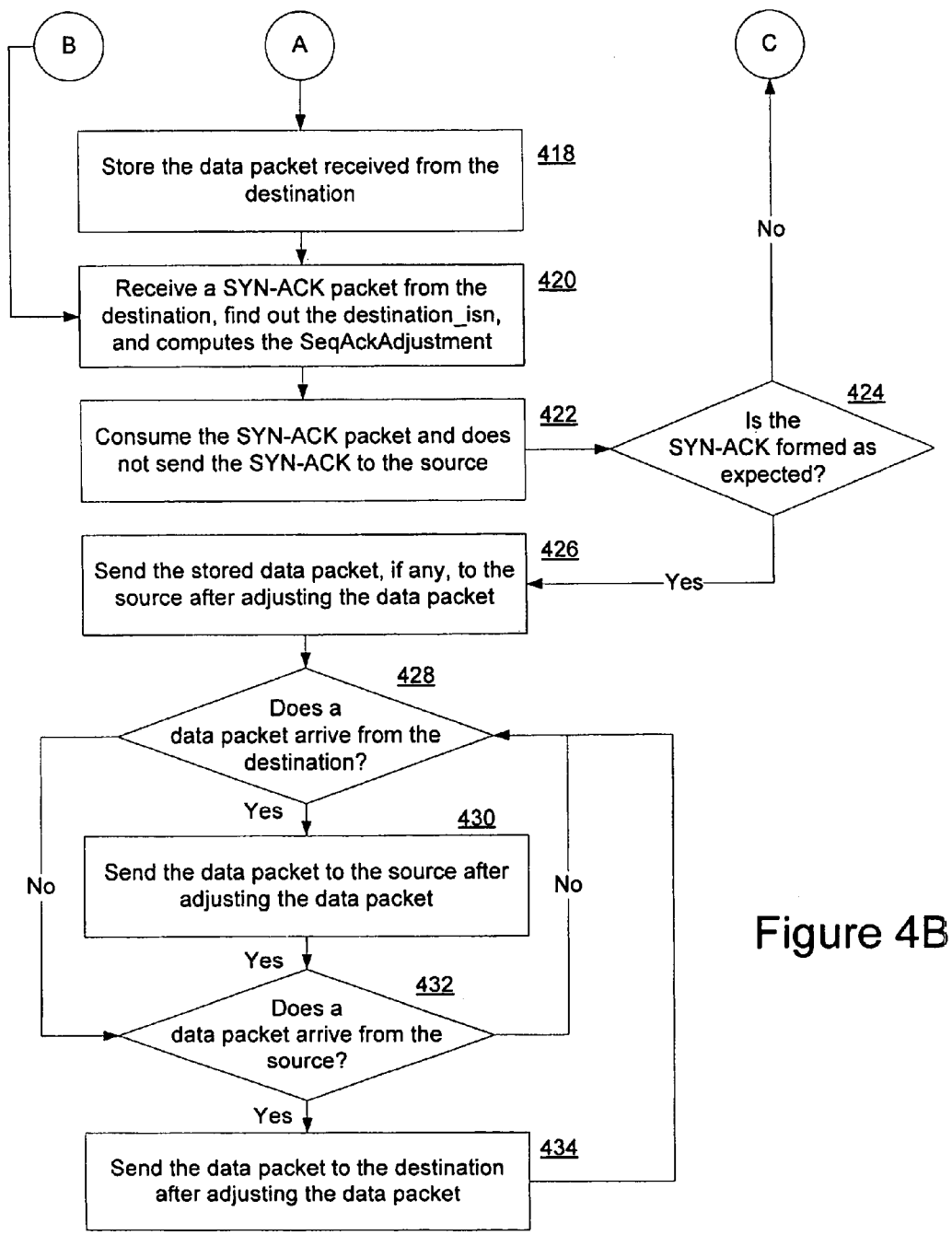

FIGS. 4A and 4B are flowcharts illustrating a TCP optimization routine that is implemented by one embodiment of the present invention and executed by control module 104 associated with source 102. In a preferred embodiment of the invention, control module 104 observes one or more responses of destination 112 to a SYN packet to determine the TCP options used in response to the TCP options in the SYN packet for the IP address of destination 112. Control module 104 thus determines the IP address and TCP option combination of destination 112 based on the observed responses. Control module 104 then determines 404 if the IP address and TCP option combination of destination 112 have been consistent. If the IP address and TCP option combination have been consistent, control module 104 activates 406 the IP address and TCP option combination of destination 112. If the IP address and TCP option combination have not been consistent, control module 104 returns to step 402 to observe further responses of destination 112 to SYN packets sent by source 102.

Control module 104 receives 408 a SYN packet from source 102. Based on the received SYN packet, control module 104 generates a synthesized SYN-ACK packet having the IP address, port number, and TCP option combination of destination 112. Control module 104 also predictably or arbitrarily decides an initial sequence number called synth_isn and inserts the synth_isn into the synthesized SYN-ACK. Control module 104 then sends the synthesized SYN-ACK to source 102. Control module 104 further characterizes the SYN packet received from source 102 and sends the characterized SYN packet to destination 112.

After control module 104 sends the synthesized SYN-ACK to source 102, it receives 410 an ACK packet from source 102, characterizes the ACK packet, and sends the characterized ACK packet to destination 112. Control module 104 then determines 412 if a data packet arrives from source 102. If a data packet arrives from source 102, control module 104 characterizes 414 the data packet received from source 102 and sends the characterized data packet to destination 112. After control module 104 sends the characterized data packet to destination 112 or if a data packet does not arrive from source 102, control module 104 determines 416 if a data packet arrives from destination 112. If a data packet arrives from destination 112, control module 104 stores 418 the data packet received from destination 112.

After control module 104 stores the data packet received from destination 112 or if a data packet does not arrive from destination 112, control module 104 receives 420 a SYN-ACK packet from destination 112. Control module 104 finds out the sequence number of destination 112 (referred to as destination_isn) from the received SYN-ACK packet. In a preferred embodiment of the invention, control module 104 also computes an adjustment number called SeqAckAdjustment by, for example, subtracting the destination_isn from the synth_isn. Control module 104 also consumes 422 the SYN-ACK packet to prevent it from reaching source 102. Control module 104 further determines 424 if the SYN-ACK packet was formed as expected (i.e., it is consistent with the determined IP address and TCP option combination of destination 112). If the SYN-ACK packet was not formed as expected, control module 104 deactivates the IP address and TCP option combination of destination 112 and returns to step 402 to observe further responses of destination 112 to SYN packets sent by source 102.

If the SYN-ACK packet was formed as expected, control module 104 sends 426 the stored data packet, if any, to source 102 after adjusting the data packet. For example, control module 104 can adjust the data packet by adding the SeqAckAdjustment to the data packet's sequence number and making a corresponding adjustment to the data packet's checksum. Control module 104 then determines 428 if a data packet arrives from destination 112. If a data packet arrives from destination 112, control module 104 sends 430 the data packet to source 102 after adjusting the data packet. Control module 104 can adjust the data packet by, for example, adding the SeqAckAdjustment to the data packet's sequence number and making a corresponding adjustment to the data packet's checksum. Control module 104 then determines 432 if a data packet arrives from source 102.

If a data packet does not arrive from destination 112, control module 104 also determines 432 if a data packet arrives from source 102. If a data packet arrives from source 102, control module 104 sends 434 the data packet to destination 112 without any characterizing after adjusting the data packet. The data packet can be adjusted, for example, by subtracting the SeqAckAdjustment from the data packet's acknowledgment number and making a corresponding adjustment to the data packet's checksum. Control module 104 then returns to step 428 to determine if a data packet arrives from destination 112. Alternatively, if a data packet does not arrive from source 102, control module 104 also returns to step 428 to determine if a data packet arrives from destination 112. The process flow continues until either source 102 or destination 112 terminates the TCP session.

Figure 5:
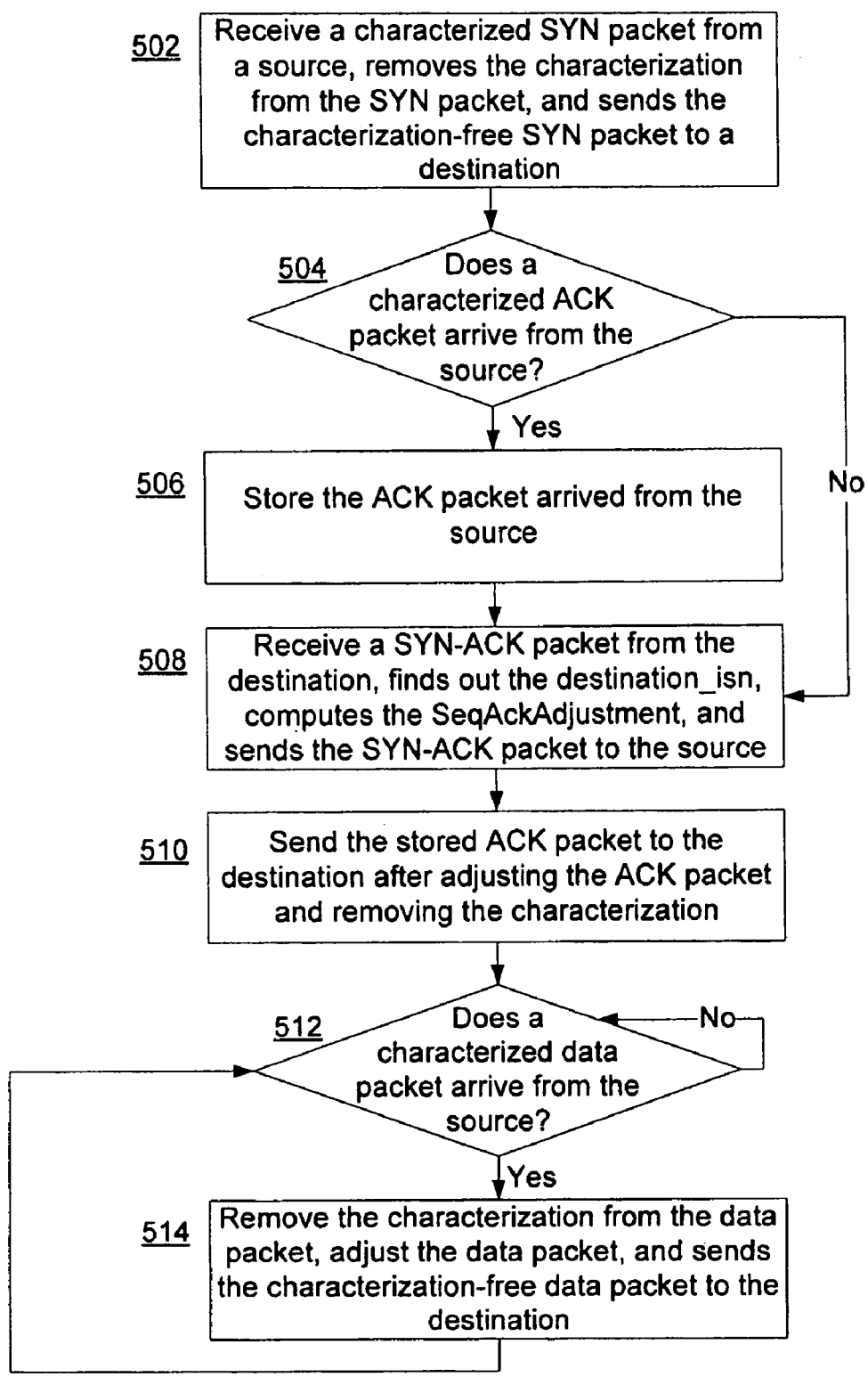
FIG. 5 is a flowchart illustrating a method implemented by one embodiment of the invention and executed by a control module relatively near a destination to optimize TCP's initial session establishment.

FIG. 5 is a flowchart illustrating a TCP optimization routine that is implemented by one embodiment of the present invention and executed by control module 110 associated with destination 112. Control module 110 receives 502 a characterized SYN packet from source 102. Control module 110 removes the characterization from the SYN packet and sends the characterization-free SYN packet to destination 112. Control module 110 then determines 504 if a characterized ACK packet arrives from source 102. If a characterized ACK packet arrives from source 102, control module 110 stores 506 the ACK packet arrived from source 102.

After control module 110 stores the ACK packet received from source 102, control module 110 receives 508 a SYN-ACK packet from destination 112. Control module 110 finds out the destination_isn from the received SYN-ACK packet and sends the SYN-ACK to source 102. In a preferred embodiment of the invention, control module 110 computes an adjustment number called SeqAckAdjustment by, for example, subtracting the destination_isn from the synth_isn.

Control module 110 also sends 510 the stored ACK packet, if any, to destination 112 after adjusting the ACK packet and removing the characterization from the ACK packet. For example, control module 110 can adjust the ACK packet by subtracting the SeqAckAdjustment from the ACK packet's acknowledgment number and making a corresponding adjustment to the ACK packet's checksum.

Control module 110 further determines 512 if a characterized data packet arrives from source 102. If a characterized data packet arrives from source 102, control module 110 removes 514 the characterization from the data packet, adjusts the data packet, and sends the characterization-free data packet to destination 112. The data packet can be adjusted, for example, by subtracting the SeqAckAdjustment from the data packet's acknowledgment number and making a corresponding adjustment to the data packet's checksum. The process then returns to step 512. If a characterized data packet does not arrive from source 102, control module 110 loops back to step 512 until source 102 or destination 112 terminates the TCP session.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A method for optimizing an initial transmission control protocol (TCP) session establishment between a source and a destination comprising:
   receiving a synchronization packet from the source at a first intermediate location associated with the source;
   in response to the received synchronization packet, generating a synthesized synchronization-acknowledgment packet including information of the destination at the first intermediate location;
   sending the synthesized synchronization-acknowledgment packet from the first intermediate location to the source; and
   sending the received synchronization packet from the first intermediate location to the destination prior to receiving an acknowledgement packet from the source at the first intermediate location.

2. The method of claim 1, wherein sending the synchronization packet from the first intermediate location to the destination comprises:
   characterizing the received synchronization packet for processing prior to receipt at the destination; and
   sending the characterized synchronization packet from the first intermediate location to the destination.

3. The method of claim 2, further comprising:
   receiving, at the first intermediate location, the acknowledgement packet from the source;
   receiving, at the first intermediate location, a data packet from the source before receiving a synchronization-acknowledgement packet from the destination;
   based on receipt of the acknowledgment packet and the data packet from the source prior to receipt of the synchronization-acknowledgement packet from the destination, characterizing the received data packet for processing prior to receipt by the destination; and
   sending the characterized data packet from the first intermediate location to the destination.

4. The method of claim 1, wherein the information of the destination includes a network address, a TCP option combination, and a synthesized sequence number of the destination.

5. The method of claim 3, further comprising:
   receiving, at a second intermediate location associated with the destination, the characterized synchronization packet;
   removing the characterization from the received synchronization packet at the second intermediate location; and
   sending the synchronization packet without the characterization from the second intermediate location to the destination.

6. The method of claim 5, further comprising:
   receiving, at the second intermediate location, the characterized data packet from the first intermediate location before receiving a synchronization-acknowledgement packet from the destination;
   storing the characterized data packet at the second intermediate location;
   receiving, at the second intermediate location, the synchronization-acknowledgement packet from the destination;
   removing the characterization from the stored data packet;
   determining an adjustment number based on the received synchronization-acknowledgment packet;
   adjusting the data packet as a function of the determined adjustment number; and sending the adjusted data packet without the characterization from the second intermediate location to the destination.

7. The method of claim 6, wherein determining the adjustment number comprises:
identifying a sequence number used by the destination based on the received synchronization-acknowledgement packet; and
subtracting the identified sequence number used by the destination from a synthesized sequence number selected by the intermediate location associated with the source.

8. The method of claim 6, wherein adjusting the data packet comprises:
subtracting the determined adjustment number from an acknowledgement number of the data packet.

9. The method of claim 5, further comprising:
receiving, at the second intermediate location, a synchronization-acknowledgment packet from the destination;
determining an adjustment number based on the received synchronization-acknowledgment packet;
receiving, at the second intermediate location, a data packet from the source;
adjusting the received data packet by subtracting the determined adjustment number from an acknowledgment number of the data packet; and
sending the adjusted data packet from the second intermediate location to the destination.

10. The method of claim 5, further comprising:
receiving, at the second intermediate location, a data packet from the destination before receiving a synchronization-acknowledgment packet from the destination;
storing the received data packet at the second intermediate location;
receiving, at the second intermediate location, the synchronization-acknowledgment packet from the destination;
determining an adjustment number based on the received synchronization-acknowledgment packet;
adjusting the stored data packet by adding the determined adjustment number to a sequence number of the data packet; and
sending the adjusted data packet from the second intermediate location to die source.

11. The method of claim 5, further comprising:
receiving, at the second intermediate location, a synchronization-acknowledgment packet from the destination;
determining an adjustment number based on the received synchronization-acknowledgment packet;
receiving, at the second intermediate location, a data packet from the source;
adjusting the received data packet by subtracting the determined adjustment number from an acknowledgment number of the data packet;
sending the adjusted data packet from the second intermediate location to the destination.

12. The method of claim 5, further comprising:
receiving, at the second intermediate location, a synchronization-acknowledgment packet from the destination;
determining an adjustment number bused on the received synchronization-acknowledgment packet;
receiving, at the second intermediate location, a data packet from the destination;
adjusting the received data packet by adding the determined adjustment number to a sequence number of the data packet;

sending the adjusted data packet from the second intermediate location to the source.

13. The method of claim 1, further comprising:
observing at the first intermediate location, before generating the synthesized synchronization-acknowledgement packet, one or more responses of the destination to one or more synchronization packets sent by the source to the destination;
identifying one or more network addresses and TCP option combinations from the responses of the destination;
storing the identified one or more network addresses and TCP option combinations in a database; and
determining if the stored one or more network addresses and TCP option combinations are consistent; and
allowing the generation of the synthesized synchronization-acknowledgement packet if the stored one or more network addresses and TCP option combinations are consistent.

14. The method of claim 13, further comprising:
receiving a synchronization-acknowledgment packet from the destination at the first intermediate location after generating the synthesized synchronization-acknowledgment packet;
determining if the destination's network address and TCP option combination as indicated in the received synchronization-acknowledgment packet are consistent with the one or more network addresses and TCP option combinations stored in the database; and
observing one or more further responses of the destination to one or more further synchronization packets sent by the source to determine a correct network address and TCP option combination of the destination.

15. A system for optimizing an initial transmission control protocol (TCP) session establishment between a source and a destination comprising:
a first intermediate control module associated with the source for:
receiving a synchronization packet from the source;
generating a synthesized synchronization-acknowledgment packet including information of the destination in response to the received synchronization packet;
sending the synthesized synchronization-acknowledgment packet to the source; and
sending the synchronization packet to the destination prior to receiving an acknowledgment packet from the source.

16. The system of claim 15, wherein, before sending the synchronization packet to the destination, the first intermediate control module characterizes the synchronization packet for processing prior to receipt at the destination.

17. The system of claim 16, wherein the first intermediate control module:
receives a data packet from the source before receiving a synchronization-acknowledgment packet from the destination;
based on receipt of the data packet before the synchronization-acknowledgment packet, characterizes the received data packet for processing prior to receipt by the destination; and
sends the characterized data packet to the destination.

18. The system of claim 15, wherein the information of the destination includes a network address, a TCP option combination, and a synthesized sequence number of the destination.

19. The system of claim 17, further comprising:
a second intermediate control module associated with the destination for:
receiving the characterized synchronization packet from the first intermediate control module;
removing the characterization of the received synchronization packet; and
sending the synchronization packet to the destination without the characterization.

20. The system of claim 19, wherein the second intermediate control module:
receives the characterized data packet from the first intermediate control module before receiving a synchronization-acknowledgment packet from the destination;
stores the characterized data packet;
receives the synchronization-acknowledgment packet from the destination;
removes the characterization from the stored data packet;
determines an adjustment number based on the received synchronization-acknowledgment packet;
adjusts the data packet as a function of the determined adjustment number; and
sends the adjusted data packet without the characterization to the destination.

21. The system of claim 20, wherein the second intermediate control module determines the adjustment number by:
identifying a sequence number used by the destination based on the received synchronization-acknowledgment packet; and
subtracting the identified sequence number used by the destination from a synthesized sequence number selected by the first intermediate control module.

22. The system of claim 20, wherein the second intermediate control module adjusts the data packet by:
subtracting the determined adjustment number from an acknowledgment number of the data packet.

23. The system of claim 19, wherein the second intermediate control module:
receives a synchronization-acknowledgment packet from the destination;
determines an adjustment number based on the received synchronization-acknowledgment packet;
receives a data packet from the source;
adjusts the received data packet by subtracting the determined adjustment number from an acknowledgment number of the data packet; and
sends the adjusted data packet to the destination.

24. The system of claim 19, wherein the first intermediate control module:
receives a data packet from the destination before receiving a synchronization-acknowledgment packet from the destination;
stores the received data packet;
receives the synchronization-acknowledgment packet from the destination;
determines an adjustment number based on the received synchronization-acknowledgment packet;
adjusts the stored data packet by adding the determined adjustment number to a sequence number of the data packet; and
sends the adjusted data packet to the source.

25. The system of claim 19, wherein the first intermediate control module:
receives a synchronization-acknowledgment packet from the destination;
determines an adjustment number based on the received synchronization-acknowledgment packet;
receives a data packet from the source;
adjusts the received data packet by subtracting the determined adjustment number from an acknowledgment number of the data packet;
sends the adjusted data packet to the destination.

26. The system of claim 19, wherein the first intermediate control module:
receives a synchronization-acknowledgment packet from the destination;
determines and adjustment number based on the received synchronization-acknowledgment packet;
receives a data packet from the destination;
adjusts the received data packet by adding the determined adjustment number to a sequence number of the data packet;
sends the adjusted data packet to the source.

27. The system of claim 15, wherein the first intermediate control module:
observes, before generating the synthesized synchronization-acknowledgment packet, one or more responses of the destination to one or more synchronization packets sent by the source to the destination;
identifies one or more network addresses and TCP option combinations from the responses of the destination;
stores the identified one or more network addresses and TCP option combinations in a database; and
determines if the stored one or more network addresses and TCP option combinations are consistent; and
allows the generation of the synthesized synchronization-acknowledgment packet if the stored one or more network addresses and TCP option combinations arc consistent.

28. The system of claim 27, wherein the first intermediate control module;
receives a synchronization-acknowledgment packet from the destination after generating the synthesized synchronization-acknowledgment packet;
determines if the destination's network address and TCP option combination as indicated in the received synchronization-acknowledgment packet are consistent with the one or more network addresses and TCP option combinations stored in the database; and
observes one or more further responses of the destination to one or more further synchronization packets sent by the source to determine a correct network address and TCP option combination of the destination.

29. A system for accelerating an initial transmission control protocol (TCP) session establishment between a source and a destination comprising:
a first intermediate control module associated with the source that:
receives a synchronization packet from the source,
in response to the received synchronization packet, generates a synthesized synchronization-acknowledgement packet including information of the destination,
sends the synthesized synchronization-acknowledgement packet to the source,
characterizes the synchronization packet received from the source for processing prior to receipt at the destination, and
sends the characterized synchronization packet to the destination prior to receiving an acknowledgement packet from the source; and a second intermediate control module associated with the destination that:
   intercepts the characterized synchronization packet,
   removes the characterization from the synchronization packet, and
   sends the synchronization packet without the characterization to the destination.

30. The system of claim 29,
wherein the first intermediate control module:
   receives the acknowledgment packet from the source,
   receives a data packet from the source before receiving a synchronization-acknowledgement packet from the destination,
   based on receipt of the acknowledgment packet and data packet from the source before receipt of the synchronization-acknowledgment packet from the destination, characterizes the received data packet for processing prior to receipt by the destination, and
   sends the characterized data packet to the destination, and wherein the second intermediate control module:
   intercepts the characterized data packet from first intermediate control module before receiving a synchronization-acknowledgment packet from the destination;
   stores the characterized data packet;
   receives the synchronization-acknowledgment packet from the destination;
   removes the characterization from the stored data packet;
   determines an adjustment number based on the received synchronization-acknowledgment packet;
   adjusts the data packet as a function of the determined adjustment number; and
   sends the adjusted data packet without the characterization to the destination.

* * * * *

UNITED STATES PATENT AND TRADEMARK OFFICE
CERTIFICATE OF CORRECTION

| | | |
|---|---|---|
| PATENT NO. | : 7,058,058 B2 | Page 1 of 1 |
| APPLICATION NO. | : 10/983131 | |
| DATED | : June 6, 2006 | |
| INVENTOR(S) | : Balraj Singh, Amit P. Singh and Vern Paxson | |

It is certified that error appears in the above-identified patent and that said Letters Patent is hereby corrected as shown below:

On Column 13, line 44 (claim 10), "die" should read --the--.

On Column 13, line 60 (claim 12), "bused" should read --based--.

On Column 16, line 33 (claim 27), "arc" should read --are--.

Signed and Sealed this

Twenty-second Day of May, 2007

JON W. DUDAS
*Director of the United States Patent and Trademark Office*